Nov. 30, 1971    H. SCHMITT    3,623,302
COMBINED HARVESTER-THRESHER MECHANISM
Filed May 21, 1970    7 Sheets-Sheet 4
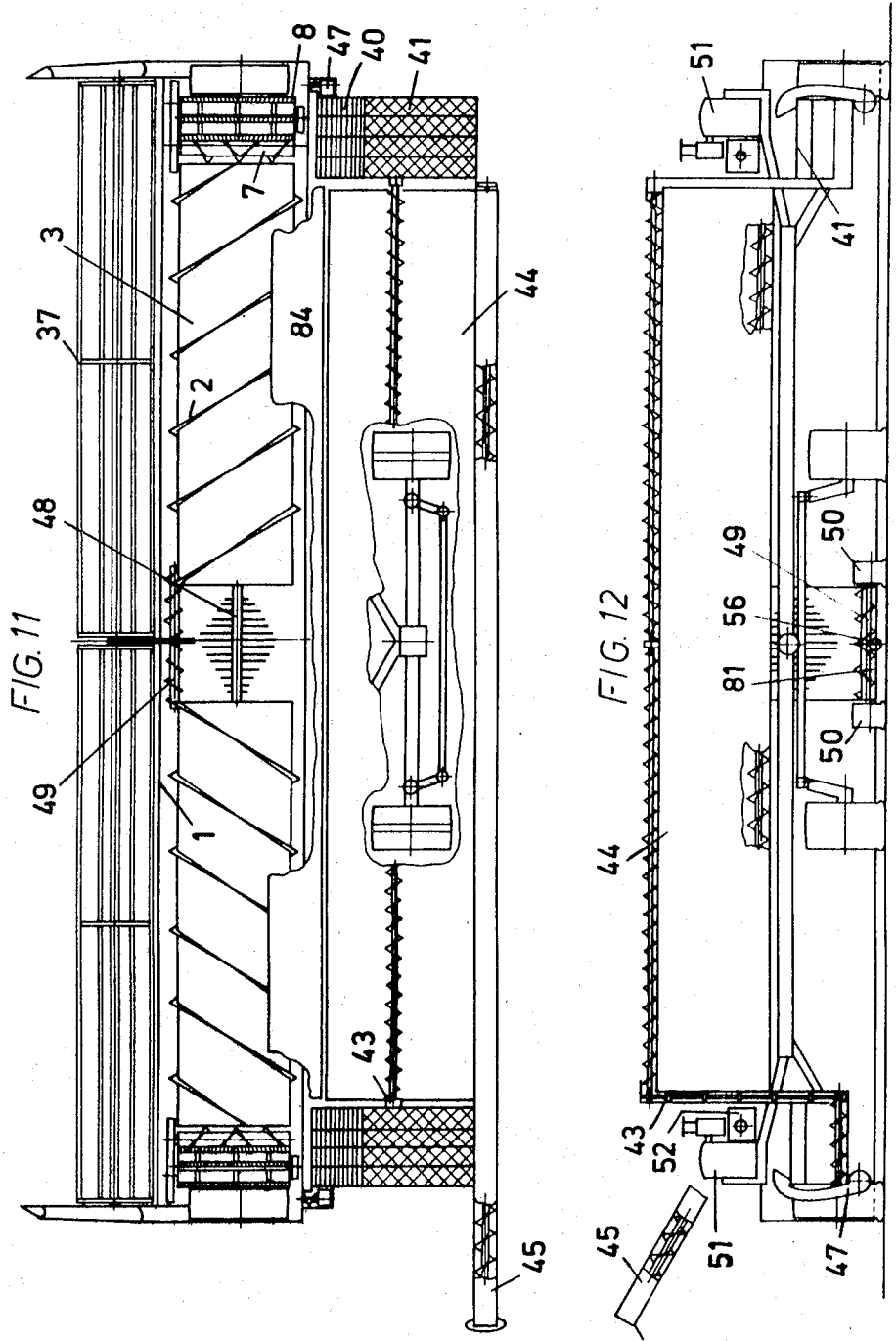
HELWIG SCHMITT
BY Ralph L. Tweedo
ATTORNEY Nov. 30, 1971  H. SCHMITT  3,623,302
COMBINED HARVESTER-THRESHER MECHANISM
Filed May 21, 1970  7 Sheets-Sheet 5

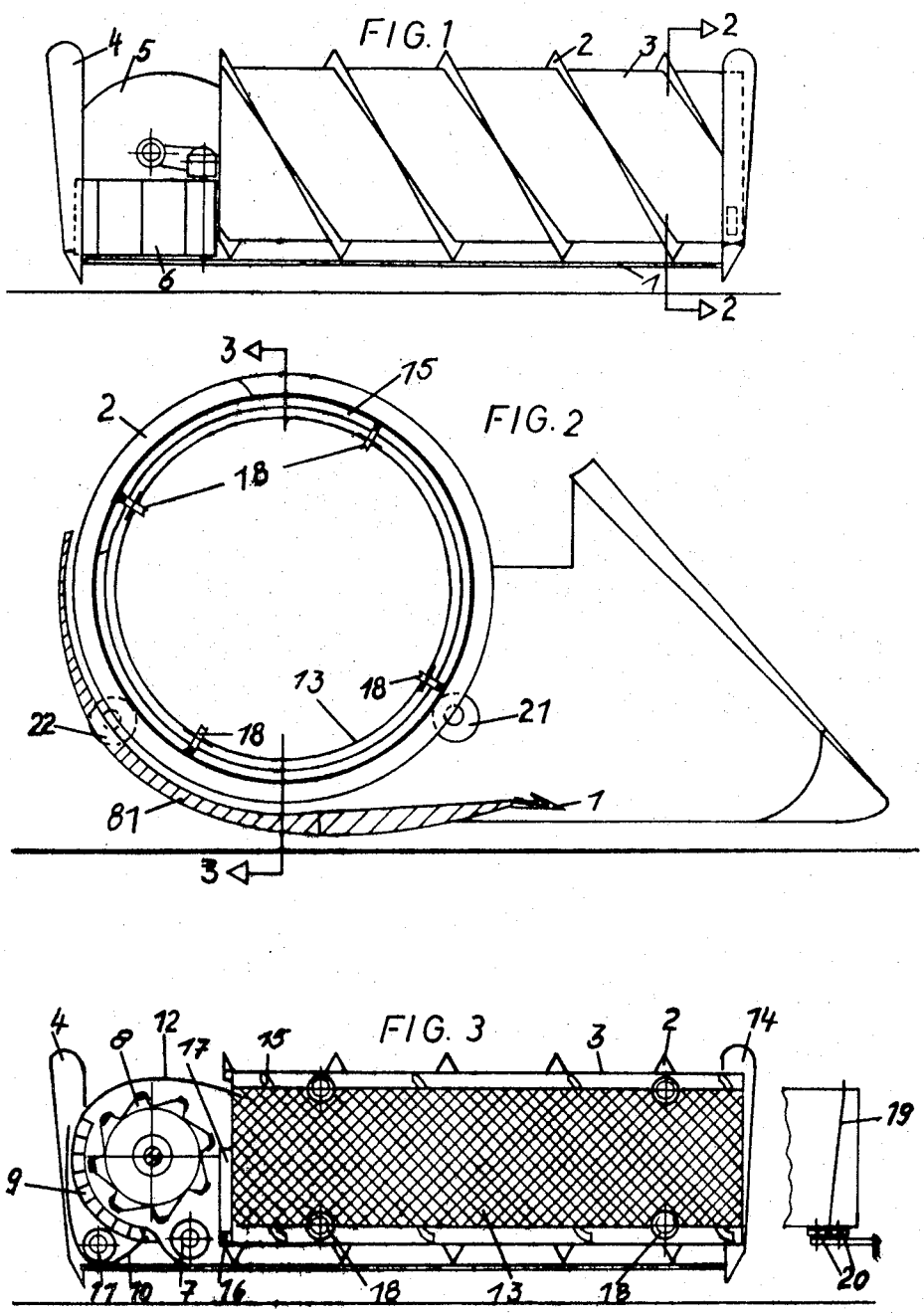

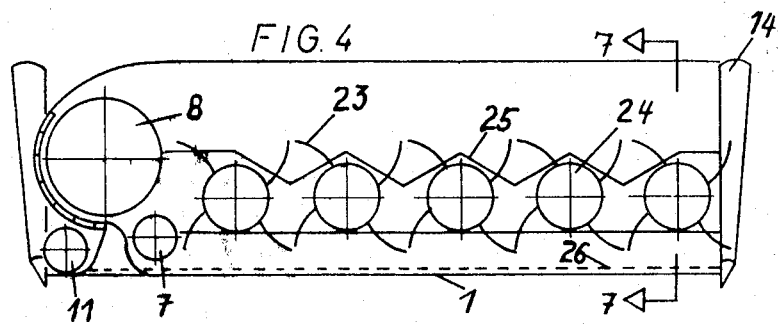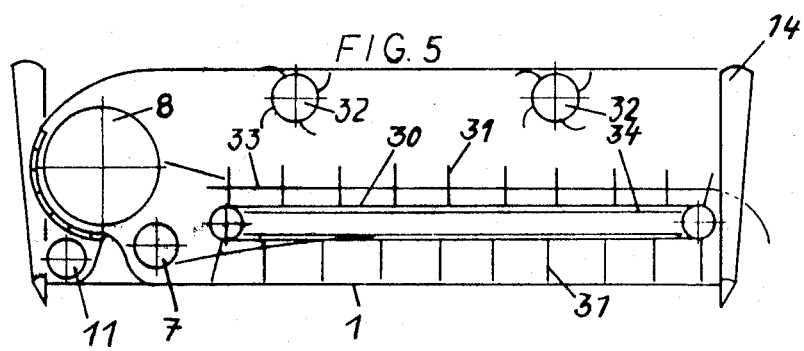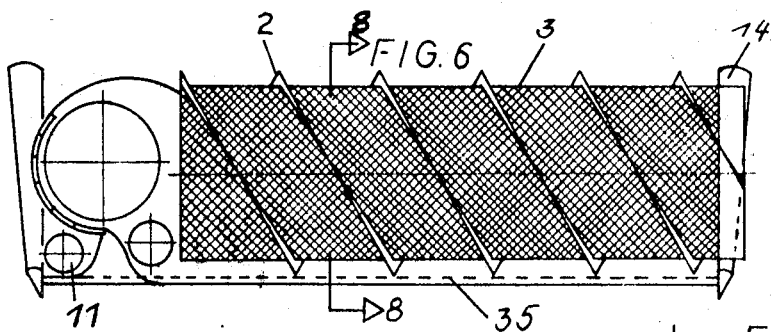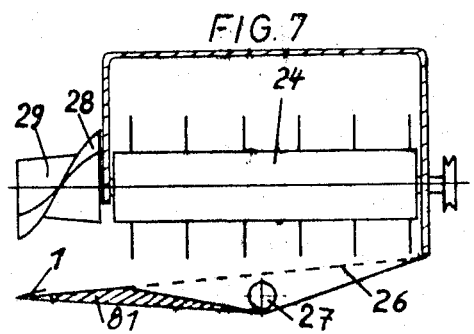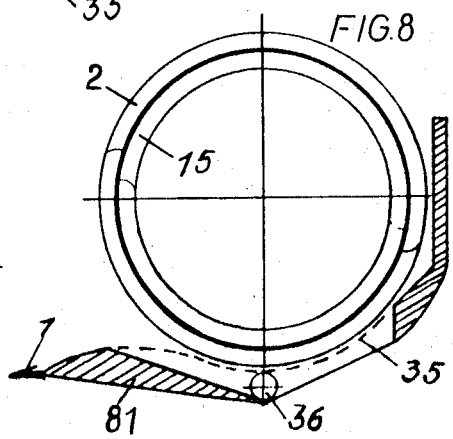

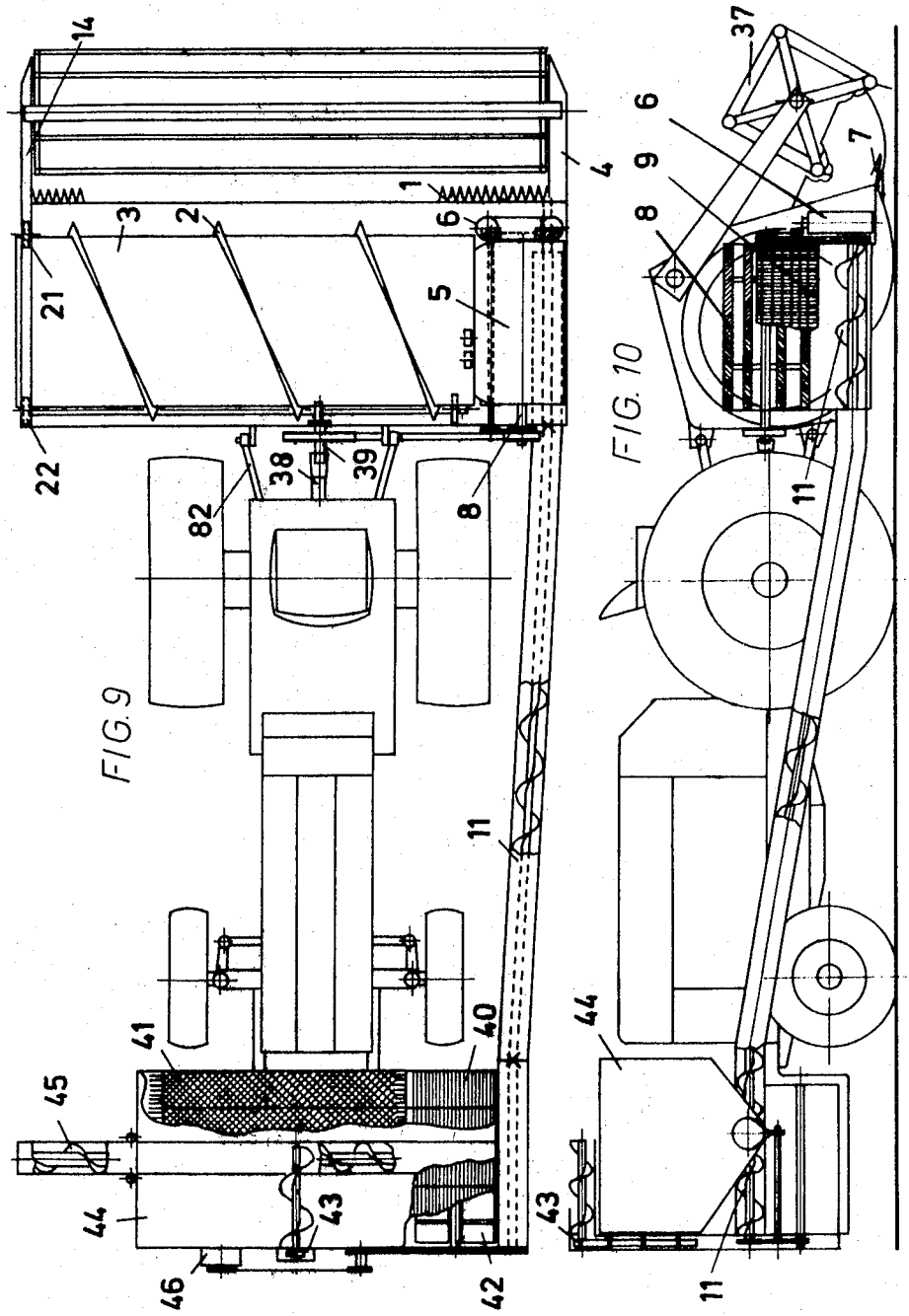

HELWIG SCHMITT
BY Ralph L. Tweedale
ATTORNEY

Nov. 30, 1971                    H. SCHMITT                    3,623,302
                    COMBINED HARVESTER-THRESHER MECHANISM
Filed May 21, 1970                                      7 Sheets-Sheet 6
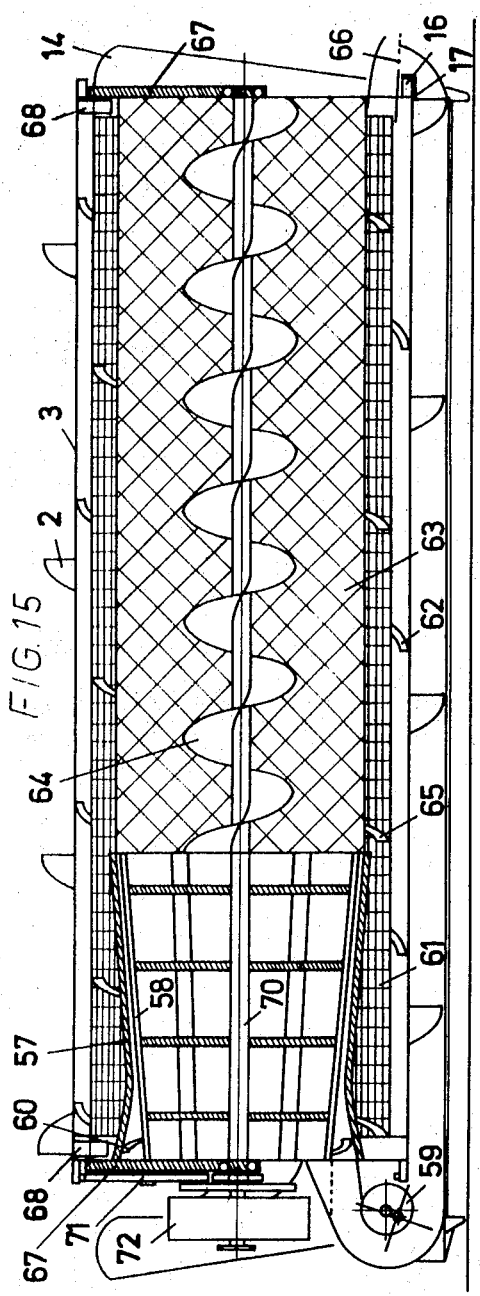
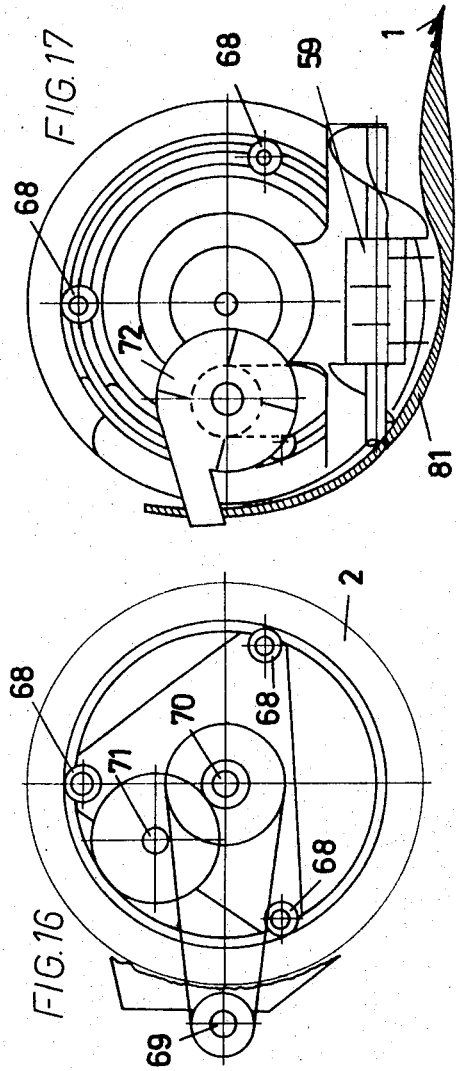
HELWIG SCHMITT
BY Ralph L. Tweedale
ATTORNEY

United States Patent Office

3,623,302
Patented Nov. 30, 1971

3,623,302
COMBINED HARVESTER-THRESHER MECHANISM
Helwig Schmitt, 41 Ulmenweg, 344 Eschwege (Werra), Germany
Filed May 21, 1970, Ser. No. 39,396
Int. Cl. A01d 41/04
U.S. Cl. 56—14.6    19 Claims

ABSTRACT OF THE DISCLOSURE

A combined harvester-thresher has a cutter bar and table carrying a threshing mechanism adjacent one end. A two-way conveyor mechanism conveys the cut crop laterally into the threshing mechanism and receives the threshed straw and residual grain after threshing and transfers them to the opposite end of the table for discharge. Separation of the residual grain from the straw takes place during this transfer. Conveyors of the auger type, the rotary finger type and the endless belt and tine type are illustrated. One machine configuration mounts the harvesting and separating assembly at one end of a tractor and has an auger conveyor feeding the separated grain to a chaff remover and a storage tank at the opposite end of the tractor. Another configuration mounts two of the harvesting and separating mechanisms end to end by a joint articulated about a fore and aft axis on a special articulated self-propelled chassis with dual engines, ground drives, chaff removing and grain storage arrangements at the outer ends of the chassis.

---

Figure 13:
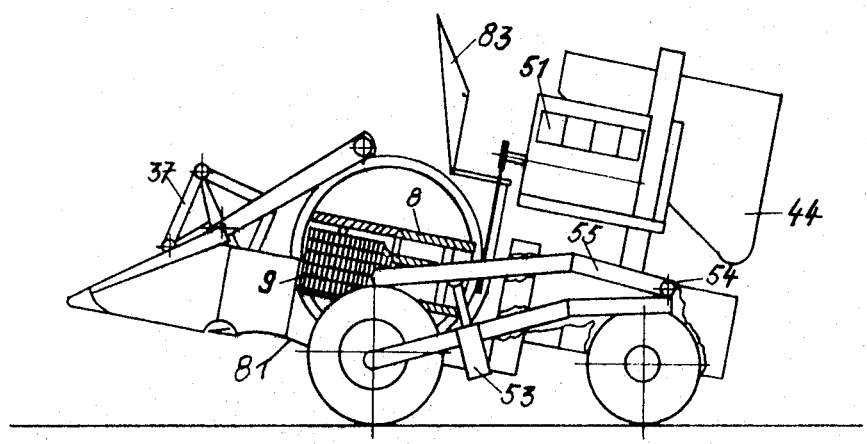

Harvester-threshers or combines are customarily designed as a large chassis unit, the principal bulk of which is a straw separating mechanism carried at a substantial elevation above the ground. Forward of this, a harvesting table including a cutter bar is carried and the cut crop is conveyed to an inclined elevating mechanism which raises the crop to the level of the straw separator. The threshing mechanism is usually at that level also, but in some designs it is located forwardly immediately behind the table. Either design results in an overall machine which is rather large, is difficult to maneuver and is expensive.

The present invention aims to reduce the bulk and the cost of a combined harvester-thresher by a relocation of the principal elements so as to eliminate the need to elevate the cut crop any substantial distance above the level of the table.

The invention utilizes a grain and straw conveyer of a dual nature and which is located behind the cutter bar and carried by the table. This conveyer first conveys the cut crop directly to the threshing mechanism located at one end of the harvesting table and at a low level and then re-conveys the straw and residual grain in the opposite direction back to the other end of the table for discharge of the straw, the grain being separated during this latter traverse.

This type of conveyer and separating device positioned behind the cutter bar enables a compact combine construction since the auger feed and the elevator of the conventional combine designs are eliminated. Furthermore, the combined operation of this grain- and straw-conveyer feed provides the possibility of positioning the threshing mechanism directly behind the cutter bar and partly behind the divider. This compact combine version, in conjunction with a conventional cleaning device or a cleaning device incorporated in the grain- and straw-conveyer, can be produced at advantageous cost either as a self-propelled type, a tractor pulled or a tractor mounted type, and used for operation in all crops to be combine harvested.

The self-propelled combine with the front cutting mechanism is prevailing on the market. The basic concept of such machines are based on the stationary threshing machines used previously. By mounting the cutting mechanism in front ahead of an elevator and by incorporating the rear beater, the longitudinal flow principle was maintained.

This requires large dimensioned components used only for conveying and large overall measurements which require high investments. They are operated during a period of only a few weeks in the short harvesting season while for the remaining period costly preparation work in regard to engine, chassis, etc. is required for winter storage. Furthermore, with the demand for larger capacities, the difficulties resulting from this type of construction are increasing in regard to transportation on public roads and shipment by rail.

This problem is solved by one form of this invention in such a way that the cut grain crop is conveyed from the cutter bar to the threshing mechanism by a cylinder on the outside of which is an auger, and features a cylindrical sieve for example in its inside; this sieve serves for the transportation and separation of the straw/grain mixture coming from the threshing mechanism.

Figure 14:
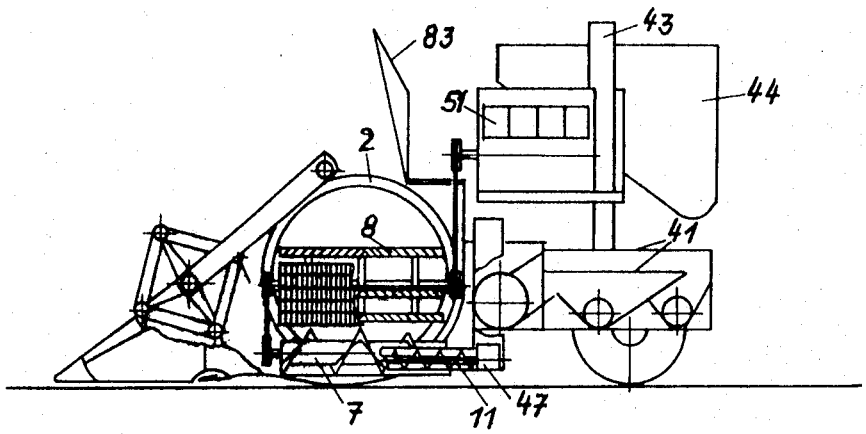
Figure 18:
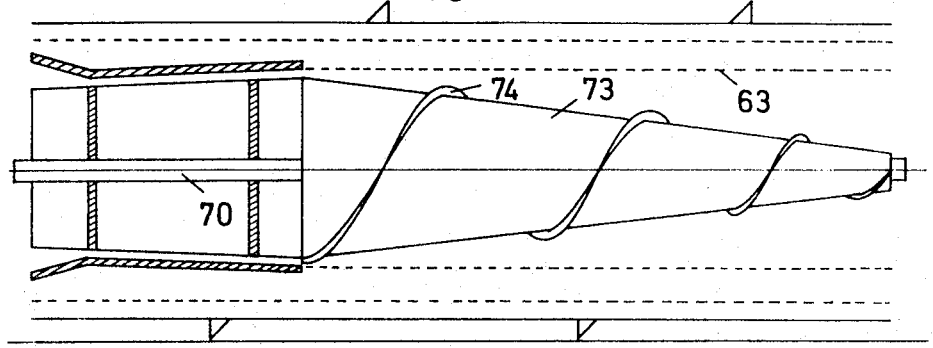
Figure 19:
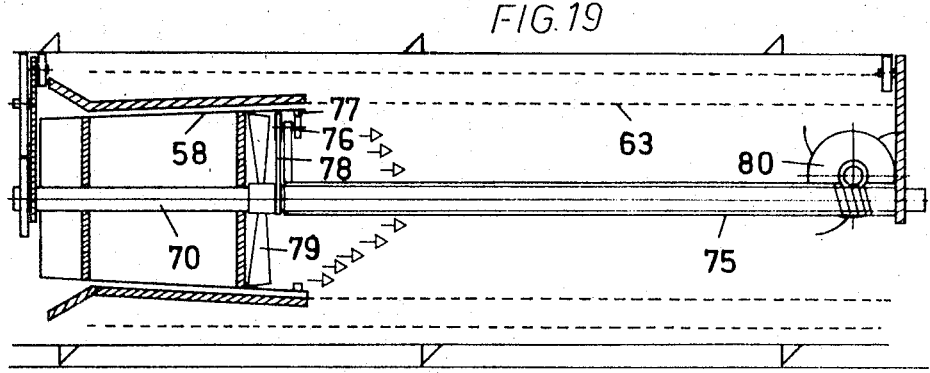
Figure 20:
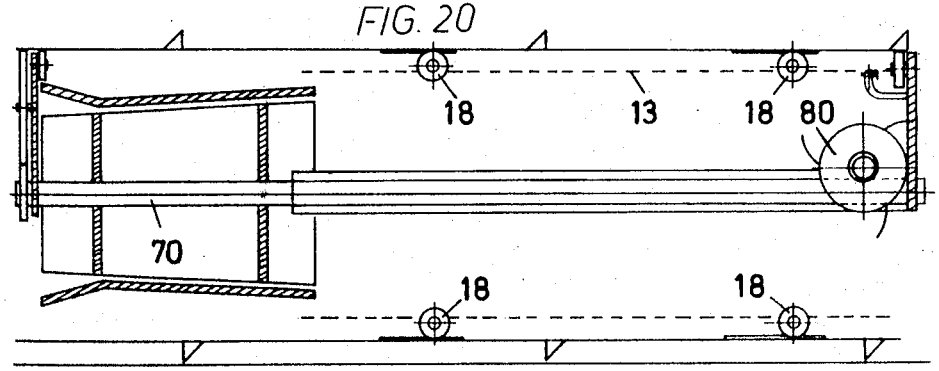

In the drawings:
FIG. 1 is a front view of a combined harvester-thresher incorporating a preferred form of the present invention.
FIG. 2 is a cross section on line 2—2 of FIG. 1.
FIG. 3 is a cross section on line 3—3 of FIG. 2.
FIG. 4 is a diagrammatic cross section corresponding to FIG. 3 of a second embodiment of the present invention.
FIG. 5 is a diagrammatic sectional view corresponding to FIG. 3 of a third embodiment of the present invention.
FIG. 6 is a front view of a fourth embodiment of the present invention.
FIG. 7 is a sectional view on line 7—7 of FIG. 4.
FIG. 8 is a cross section on line 8—8 of FIG. 6.
FIG. 9 is a diagrammatic top view of a tractor mounted version of the present invention.
FIG. 10 is a side view of the tractor mounted version.
FIG. 11 is a top view of a special chassis mounted version of the present invention.
FIG. 12 is a rear view of the version illustrated in FIG. 11.
FIG. 13 is a side view of the version illustrated in FIG. 11 showing the parts in transport position.
FIG. 14 is a view corresponding to FIG. 13 showing the parts in working position.
FIG. 15 is a sectional view corresponding to FIG. 3 of a fifth embodiment of the present invention.
FIG. 16 is a diagrammatic view of the drive and positioning mechanism used in the embodiment of FIG. 15.
FIG. 17 is an end view, partly in section, of the mechanism of FIG. 15.
FIG. 18 is a fragmentary diagrammatic view of a sixth embodiment of the invention.
FIG. 19 is a diagrammatic view of a seventh embodiment of the invention.
FIG. 20 is a diagrammatic view of an eighth embodiment of the invention.

In the case of the combine described by FIG. 1, the grain crop is cut by the cutter bar 1 and fed to the auger 2 of the cylindrically shaped grain- and straw-conveyer 3 and from the front to the threshing mechanism 5 which is positioned partly behind the divider 4 and partly behind the cutter bar 1.

The grain cut by the cutter bar 1 in front of the threshing mechanism 5 is conveyed to the grain and straw conveyor 3 by a conveying canvas 6 controlled by rollers with almost vertical axles Referring to FIG. 3, the grain conveyed by the auger 2 is fed to the threshing cylinder via a conveyer drum 7 which, on account of its surface, spreads the grain evenly over the width of the threshing mechanism 8. The threshed out grains drop through the concave 9 into an auger conveyer 11 positioned below it in an auger pan 10; this auger conveyer takes the threshed out grain/chaff mixture to a cleaning device.

The cylinder 8 feeds the threshed out straw by means of a deflector plate 12 to the cylindrical screen 13 which is positioned inside the grain- and straw-conveyer 3.

Due to the rotation and the reciprocating axial movement of this cylindrical screen 13, the straw is taken from the side of the threshing mechanism to the other side and is positioned—right through the divider 14 onto the ground. During this conveying action the remaining grains are separated from the straw by the cylindrical screen 13 and conveyed to the side of the threshing mechanism by means of the auger 15 positioned at the inside of the grain- and straw-conveyer 3. From there they are transported by means of a vane 16 fitted at the straw- and grain-conveyer, via a fixed chute 17 and a conveyer channel into the auger 11 from where they are taken to the cleaning mechanism together with the grains from the concave 9.

The cross section of FIG. 2 shows the positioning of the cylindrical screen 13 where on the axles, for instance, four rollers 18 are fitted which are guided by rails on the inner wall of the grain and straw-conveyer 3. The reciprocating axial movement is effected e.g. by threaded guide 19 arranged on the cylindrical screen 13. This guide is either forced by one roller, each side 20 with fixed axles from the right to the left, or by one roller only away from the threshing cylinder. The movement in the direction to the cylinder is then actuated by a tensioning spring as soon as the thread type guide 19 is released by the roller 20 once or several times per turn.

The bearing and the drive of the grain and straw conveyer 3 is effected on the side opposite to the threshing cylinder 8 via two rollers 21 and 22 which are incorporated in the divider wall 14. Drive and bearing of the grain and straw conveyer 3 at the cylinder side are effected via a roller 22 identical to that positioned at the opposite side. The front roller 21 is eliminated then and is positioned at the upper inside of the grain and straw-conveyer 3. The grain- and straw-conveyer is, for example, guided with V-shaped rails in the rollers or pulleys.

Instead of the cylindrical screen 13 operating with reciprocal axial movement, a screen which only rotates may be used. For conveying straw in this case, an auger would have to be fitted on the inside of the cylindrical screen 13

FIGS. 4 and 7 show another embodiment. The grain crop is cut by the cutter bar 1 and fed to the conveyer drum 7 by the tines 23 in the lower circuit of the rotating drums 24. Contrary to the operating process shown in FIGS. 1–3, the straw ejected by the threshing cylinder 8 is taken away from the threshing cylinder 8 by the tines 23 in the upper circuit of the drums 24 and thence through the dividers 14 and deposited onto the ground.

During this conveying process, the grains are separated from the straw by the jolting conveying action of the tines 23 and drop through the grill type guides 25 and through the grain crop flow (cut material) effected on the lower side of the drums 24 and the grille 26, below it, into the auger feed 27 positioned further below in the pan 81. With this auger feed 27, the grains dropped through the straw are conveyed to the auger feed 11 and taken to the cleaning unit.

In order to facilitate the entrance of the cut material below the drums 24, on the axles of the drums 24 intake augers 28 are fitted on a cone 29. The front bearings of the drums 24 are adjustable in height.

The embodiment shown in FIG. 5 features, instead of drums 24 fitted with tines 23 as shown in FIG. 4, an endless and circulating tine belt 30 which, with tines 31 on its lower side feeds the cut material via the feeding drum 7 to the threshing mechanism, while the tines 31 on the top side take the straw from the threshing cylinder 8 through the opposite divider 14 and deposit it onto the ground. In order to achieve sufficient motion of the straw for separating the remaining grains, beaters 32 counteracting to the straw flow are arranged above the tine belt 30. The grains separated from the straw drop through the grille 33 onto a feeder pan inclined to the rear 34. From there they are conveyed via an auger or a shaker groove into the auger 11.

FIGS. 6 and 8 show a grain- and straw-conveyer featuring a screen type cylinder wall. With the auger 2 positioned on its outside, the grain is fed into the threshing mechanism. The straw coming out of the threshing mechanism will be transported by an auger 15 which is fitted on the inside of the screen type grain- and straw-conveyer to the opposite side and will be deposited onto the ground.

The grains still remaining within the straw moving from the threshing cylinder are separated from the straw by means of the screen type cylinder wall of the grain- and straw-conveyer 3 and then drop through the cut material below the grain- and straw-conveyer 3 and through the grille 35 in the table bottom 81, into the auger feed 36 positioned below, and are taken by it to auger 11. In order to achieve the separation release, respectively, of the grains only during the upward motion of the grain- and straw-conveyer 3, vane-shaped impeller plates may be fitted axially at the outside of the grain- and straw-conveyer.

Drive and bearing of the grain- and straw-conveyer 3 with screen type cylinder wall are as shown in FIGS. 1–3.

FIGS. 9 and 10 show a version of the combine described above, fitted with a cleaning device operating on the common principle, and mounted to a tractor. The tractor, driven backwards from its normal direction of travel, carries at the 3-point-linkage 82, the combine with cutting, threshing and shaker units, and at a special frame at the opposite end, the cleaning device and the grain tank. The grain crops cut by the cutter bar 1, supported by the reel 37, flow outside of the grain- and straw-conveyer 3 by means of an auger 2 into the threshing mechanism 5 with cylinder 8 and concave 9. The grain separated here drops into the auger 11 and is fed to the cleaning device with grain pan 40, the sieves 41 and fan 42 at the front of the tractor. The cleaned grain is taken via an elevator 43 and a conveying auger to the grain tank 44 and from there via an auger discharge 45 discharged into a trailer. The parts of the kernels separated through the sieves 41 are rethreshed by the rethresher 46 and re-fed to the grain pan 40. Drive is taken from the tractor PTO via a joint shaft 38 and an intermediary shaft 39 to the shaft of the threshing cylinder 8. At that point the drive passes to the feeding drum 7 and to the auger feed 11 which serves as drive shaft for the cleaning mechanism positioned at the tractor front.

FIGS. 11–14 show a giant combine version consisting of two homologously arranged individual combines with the grain and straw conveying device.

The grain is cut by the cutter bar 1 assisted by the reel 37 and conveyed by the auger 2 of the grain- and straw-conveyer 3 and via the feeder drum 7 to the threshing cylinder 8 and to the concave 9. The grain is transported to the threshing mechanism positioned at the right and left sides. The grain sifted by the concave 9 drops into the auger feed positioned below it, at the end of which it is taken, by means of a paddle elevator 47, to the grain pan 40 of the cleaning mechanism. From there it drops onto the screens 41 and via the elevator it gets into the grain tank 44. The unloading auger 45 transfers the grain into a trailer or other receiver.

The straw moving from the threshing mechanism together with the remaining grains is taken to the center of the combine from the right and left hand sides by the grain- and straw-conveyer 3. During this conveying operation, the grains are separated from the straw. The straw is taken to the rear and is deposited by a rotating tine beater 48 onto the field. In order to avoid that the cut grain crop is also seized by this tine beater 48 and deposited on the field, an auger 49 is fitted in front of the tine beater 48, conveying from the center of the combine to the left hand and right hand sides. This auger may as well be replaced by any other feeding device.

In order to have sufficient adaptation to the ground of the cutter bar with large cutting width, at the center of the combine, the cutter bar 1, the reel 37, the auger 49, the tine beater 48 as well as the two table bottoms 81 of the two homologously arranged combines are articulatedly coupled. The two guide wheels 50 are fitted to the table pan and maintain the clearance between cutter bar and ground.

The combine is driven by two engines 51 which are arranged near the threshing cylinders 8. It features hydrostatic ground-drive via the hydro-pump 52.

Adjustment from working into transport position is actuated via a hydraulic lift cylinder 53 which lifts the twin frame 55, extending from the turning point 54 thus lifting the entire combine at the front. At this lifting process, the turning point 56 of the table bottoms is locked.

The essential controls such as steering, ground-drive speed, and cutting height are controlled automatically and the major checks like losses, engine strain, grain flow inside all components can be indicated on the controls on the dash board and read by the operator on the foot bridge.

For road transportation the combine is put on a low bed trailer, the hydrostatic ground drive of which is actuated by the engine 51 and the hydro-pump 52 of the combine.

FIG. 15 shows a further embodiment. Contrary to those above described, the threshing mechanism with the concave 57 and the axially conveying cylinder 58 which is shown here in conical shape with axial-tangential-radial conveying properties, is incorporated in the grain- and straw-conveyer.

The material cut by the cutter bar 1 is fed by the auger 2 of the grain- and straw-conveyer 3 to the feeder cylinder 59 which concentrates the grain at its center and feeds it into the threshing mechanism "over head" via eccentric controlled fingers.

In order to enable axial feeding of the cut crop into the threshing mechanism, there is a wide aperture between the threshing drum 57 and the threshing cylinder 58. An auger 60 positioned on the concave operates inside this aperture and feeds the grain to the threshing mechanism. The grain sifted by concave 57 drops onto the grain screen 61 rotating in the same direction with the concave, where another separation takes place. The grain dropping through this grain screen 61 is transported to the opposite side by an auger 62 positioned at the inside wall of the grain- and straw-conveyer 3, and from there it is taken by a vane 16 across the groove 17 and by a further conveying device to the grain tank.

The straw with the remaining grains is taken into a cylindrical sieve 63 rotating with the concave and from there, taken outside by counter-rotating feeding auger 64 positioned at the shaft of the threshing cylinder, through the divider 14 and deposited onto the ground. During this conveying operation, the remaining grains drop through the cylindrical sieve 63 onto the grain screen 61 and from there pass to the inside of the grain- and straw-conveyer 3.

The major interminglings existing on the grain screen 61 are transported outside by an auger 65 positioned at the inside of this grain screen. During this conveying process kernels not yet threshed drop through the sieve 66 and join again the grain flow to the threshing cylinder. The threshing cylinder 58 is supported with the threshing cylinder-shaft 70 in the side walls 67 which are rigidly connected with the table bottom 81.

On these side walls 67, on the top, rear and front sides of which one roller each 68 is fitted, which carry the grain- and straw-conveyor 3 with components as concave 57, cylindrical sieve 63, and grain screen 61 rigidly fittted therein. Drive is taken via a transmission shaft 69 to the threshing cylinder shaft 70. From the threshing cylinder shaft 70 the grain- and straw-conveyer 3 with the pertaining components is driven via another transmission shaft 71 in opposite direction to the threshing cylinder and at a lower speed.

A suction fanning mill 72 arranged at the left hand side sucks off the light weight interminglings as chaff at the spot where the grain rolls down on the inner wall of the grain- and straw-conveyer.

FIGS. 18–20 show further possibilities of conveyance of straw through the cylindrical sieve 63. In FIG. 18 a cone 73 is fitted to the threshing cylinder-shaft 70 which carries an auger 74 on its surface. On account of this ararngement, the straw is more tightly pressed against the counter-rotating cylindrical sieve 63.

FIG. 19 shows the pneumatically operated straw conveyance through the cylindrical sieve 63. The anti-wrapping device 75 fixed round the shaft of the threshing cylinder 70 carries a transmission shaft 76 at the side of the threshing cylinder. This transmission shaft is driven via a gear wheel 77 positioned at the inner side of the threshing cylinder 58. From this transmission shaft via a V-belt or a chain 78 an axially operating fanning mill 79 positioned on the threshing cylinder shaft 70 is driven. With the air taken in through the threshing cylinder 58, the straw is pushed through the rotating cylindrical sieve 63. At the opposite side it is deposited by means of a rotating tine fitted drum 80 through the opening below onto the ground. The tine fitted drum 80 is driven by an auger drive positioned on the shaft of the threshing cylinder 70.

FIG. 20 shows—as described by FIG. 3—a cylindrical sieve 13 rotating with the grain- and straw-conveyer 3 and operating with reciprocal axial motion, positioned behind the axially feeding threshing mechanism.

What is claimed is:

1. A combined harvester-thresher mechanism comprising a cutter bar and a crop receiving table; a threshing device positioned above an end of the table; a unitary conveying assembly positioned above the table adjacent to the threshing device; and including a first conveyor for conveying the crop laterally from the cutter bar toward the threshing device and a second conveyor for conveying the threshed residue laterally away from the threshing device, the two conveyors being arranged in vertically spaced relation above the table and acting to convey materials in directions opposite to each other.

2. A mechanism as defined in claim 1 wherein the second conveyor is also a separator for separating grain from the straw and a third conveyor is provided for conveying the separated grain back toward the threshing device.

3. A mechanism as defined in claim 1 wherein the first conveyor is a cylindrical body carrying an auger on its out side and the second conveyor is a grain and straw separator.

4. A mechanism as defined in claim 1 wherein the first conveyor is a cylindrical body carrying an auger on its out side and the second conveyor is a cylindrical screen carrying an auger of opposite hand on its out side.

5. A mechanism as defined in claim 4 wherein means is provided for reciprocating the screen axially during rotation thereof.

6. A mechanism as defined in claim 1 wherein the first and second conveyors comprise a series of tined rotors, the tines of which move toward the threshing device during the lower arc of their travel and move away from the threshing device during the upper arc of their travel, and which includes a grille means separating the materials.

7. A mechanism as defined in claim 1 wherein the first and second conveyors comprise an endless tine carrier mounted on rotary supports at each end and having a lower reach along which the tines move toward the threshing device, and an upper reach along which the tines move away from the threshing device.

8. A mechanism as defined in claim 6 wherein means is provided for retaining the straw on the second conveyor while allowing grain to fall-through to the first conveyor and through the crop being conveyed thereby.

9. A mechanism as defined in claim 7 including beaters arranged above the second conveyor to retard the flow of residue material and assist in separating grain entrained therein.

10. A mechanism as defined in claim 1 wherein the two conveyors are augered, concentric cylindrical bodies and the threshing device is a cylinder and concave coaxially arranged within one end of the conveyors.

11. A mechanism as defined in claim 10 wherein the cylinder and concave are conical in form.

12. A mechanism as defined in claim 10 wherein the cylindrical body of the second conveyor is a screen.

13. A mechanism as defined in claim 10 wherein means is provided for driving the threshing cylinder in one direction and driving the second conveyor in the opposite direction.

14. A mechanism as defined in claim 10 wherein there is provided means for producing a current of air through the inner cylindrical body flowing counter to the direction of the conveyed material flow.

15. A mechanism as defined in claim 1 wherein there is provided means for supporting, propelling, and driving the harvester-thresher comprising a tractor having a hitch at one end supporting the harvester-thresher; a power take-off shaft connected to drive the threshing device and the conveyors; means supported at the opposite end of the tractor for cleaning the threshed grain and a combined conveyor and drive shaft connecting said last means with the threshing device to convey separated grain toward the cleaning means and to drive the cleaning means.

16. A mechanism as defined in claim 15 including a grain tank also mounted on the opposite end of the tractor, and means for transferring cleaned grain to the tank.

17. A mechanism as defined in claim 1 including a second cutter bar, table, threshing device, and conveying assembly; means articulating the two tables together at their ends remote from the threshing device, and propulsion and driving means connected to propel and operate the two harvester-thresher mechanisms as a unitary machine.

18. A mechanism as defined in claim 17 including a carriage forming a common ground support for both mechanisms at their point of articulation.

19. A mechanism as defined in claim 17 including a beater intermediate the two conveying assemblies for propelling expelled straw downwardly and rearwardly to the ground.

References Cited

UNITED STATES PATENTS

| | | | |
|---|---|---|---|
| 1,859,759 | 5/1932 | Walters | 56—14.6 |
| 1,879,960 | 9/1932 | Thoen | 56—14.6 |
| 1,932,714 | 10/1933 | Thoen | 56—14.6 |
| 1,941,026 | 12/1933 | Thoen | 56—14.6 |
| 2,433,162 | 12/1947 | Scranton et al. | 130—27 F |
| 3,503,190 | 3/1970 | Van der Lely | 56—14.6 |

LOUIS G. MANCENE, Primary Examiner

J. A. OLIFF, Assistant Examiner

U.S. Cl. X.R.

130—27 F, 27 T